G. SELDEN.
Pipe-Tongs
No. 168,291.  Patented Sept. 28, 1875.
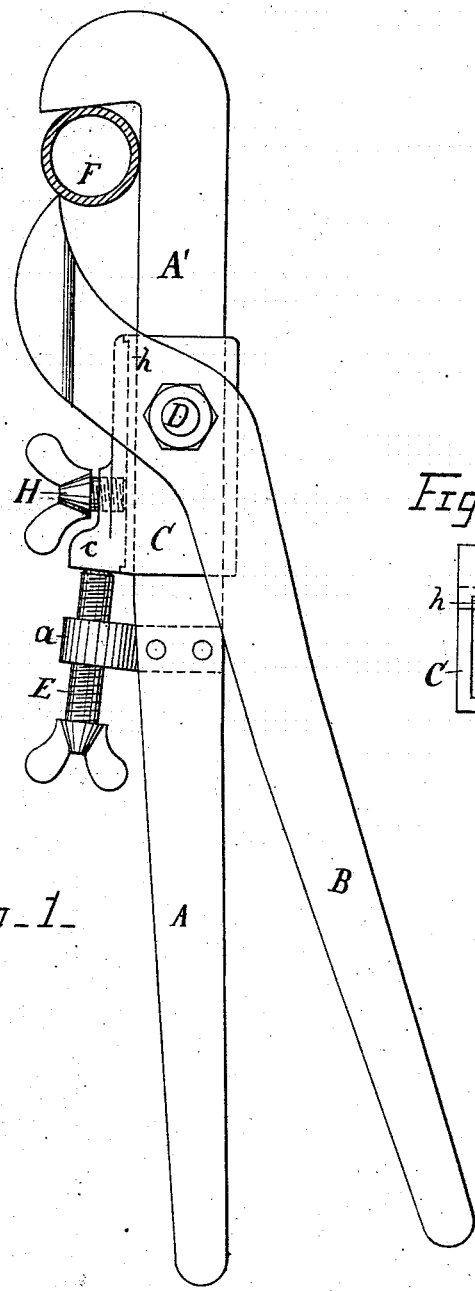
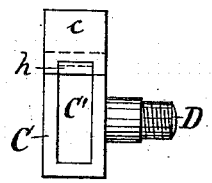
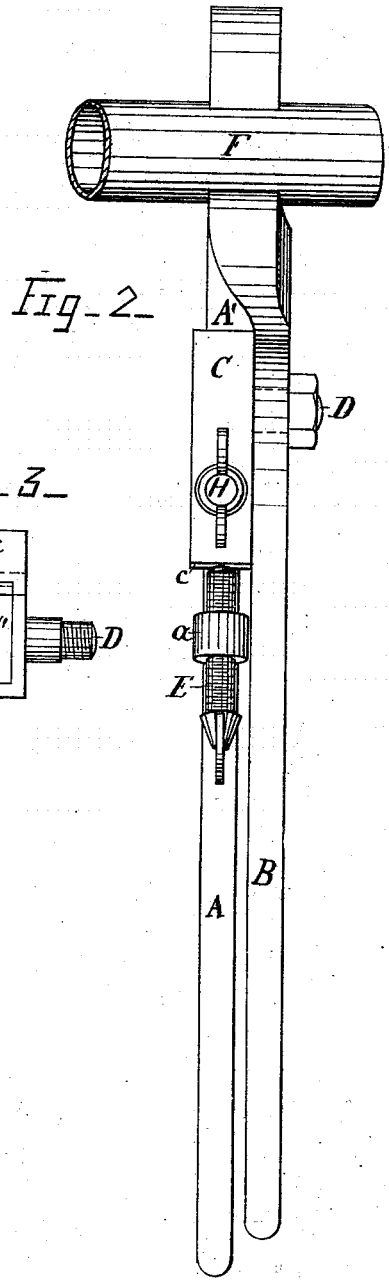
Witnesses
Jno H Briggs
Jno W Little
Inventor
Geo Selden

UNITED STATES PATENT OFFICE.

GEORGE SELDEN, OF ERIE, PENNSYLVANIA.

IMPROVEMENT IN PIPE-TONGS.

Specification forming part of Letters Patent No. 168,291, dated September 28, 1875; application filed July 24, 1875.

CASE A.

*To all whom it may concern:*

Be it known that I, GEORGE SELDEN, of the city of Erie, State of Pennsylvania, have invented an Improvement in Pipe-Tongs, of which the following is a specification:

My invention has for its object the construction of adjustable pipe-tongs at once simple, strong, durable, and effective. To this end the invention consists of the following parts: The hooked-jaw lever A, with the shank A', of any desired shape, and with a lug, $a$, for the reception of a thumb-screw, E; the sleeve C, an end view of which is shown in Figure 3, provided with a lug, $c$, and fulcrum-pin D, and also an opening, C', which corresponds in shape with that of shank A' of lever A. The sleeve C slides on the shank A' of lever A, and may be made in one piece, or it may consist of separate pieces fastened together by any suitable means. The fulcrum-pin D connects the lever B with the sleeve C. By the action of the thumb-screw E against the lug $c$ on sleeve C the lever B is adjusted to different-sized pipes. F represents a pipe.

I claim as my invention—

The combination, in the pipe-wrench herein described, of the hooked-jaw lever A, lug $a$, and thumb-screw E with the sleeve C, fulcrum-pin D, and lever B, all constructed substantially as described, and for the purpose set forth.

GEO. SELDEN.

Witnesses:
    JNO. H. BLISS,
    JNO. W. LITTLE.